Figure 1:
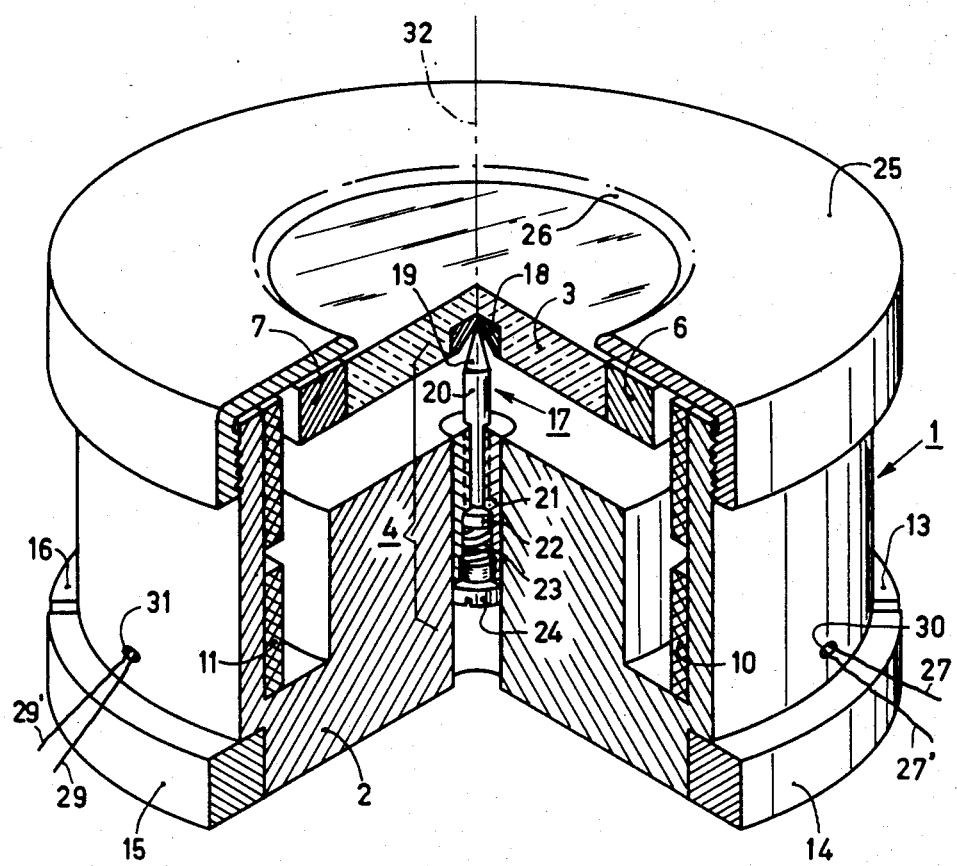

United States Patent [19]
Lakerveld et al.

[11] 4,073,567
[45] Feb. 14, 1978

[54] PIVOTING MIRROR DEVICE

[75] Inventors: Herman Gerard Lakerveld; Gerard Eduard van Rosmalen, both of Eindhoven, Netherlands

[73] Assignee: U.S. Philips Corporation, New York, N.Y.

[21] Appl. No.: 638,510

[22] Filed: Dec. 8, 1975

[30] Foreign Application Priority Data

Sept. 29, 1975 Netherlands .................... 7511417

[51] Int. Cl.² ............................................. G02B 27/17
[52] U.S. Cl. ........................................ 350/6.5; 350/285; 358/199
[58] Field of Search ............ 350/6, 7, 285, 252, 350/9 D; 178/7.6, 6.6 D; 274/10 B, 13 S, 10 SS, 20, 45, 46 D; 84/461; 346/140; 358/199; 310/36; 179/100.3 V

[56] References Cited

U.S. PATENT DOCUMENTS

| | | | |
|---|---|---|---|
| 1,918,358 | 7/1933 | Walton | 350/6 |
| 2,034,583 | 3/1936 | Koch | 350/6 |
| 2,535,495 | 12/1950 | James | 274/13 A |
| 3,532,408 | 10/1970 | Dostal | 350/7 |
| 3,544,221 | 12/1970 | Putnam | 350/7 |
| 3,871,663 | 3/1975 | Stave | 274/10 S |
| 3,891,299 | 6/1975 | Rushing | 350/6 |
| 3,946,166 | 4/1976 | Wossidlo | 179/100.3 V |

FOREIGN PATENT DOCUMENTS 354,117  9/1957  Switzerland .................... 350/7

Primary Examiner—John K. Corbin
Assistant Examiner—B. W. delos Reyes
Attorney, Agent, or Firm—Frank R. Trifari; Simon L. Cohen

[57] ABSTRACT

A pivoting mirror device for pivoting a pivoting mirror about two mutually perpendicular pivoting axes under the influence of electric control signals, in particular for a video player which reads information from a video disk with the aid of a light beam using optical means, the mirror being journalled so as to be pivotable to all sides and the device comprising electro-dynamic drive means which include permanent magnets and control coils for controlling the pivoting movements. The mirror is supported near its center, while permanent magnetic positioning means which co-operate with permanent magnetic means which are connected to the mirror continually subject the bearing to pressure. In order to obtain a high efficiency the permanent magnetic drive means are magnetized in such a way that the magnetic field lines, at least at the location of the control coils, extend substantially parallel to the reflecting surface of the mirror, while moreover at least a part of the turns of the control coils extend parallel to the reflecting surface and transversely to said field lines.

6 Claims, 3 Drawing Figures

PIVOTING MIRROR DEVICE

The invention relates to a pivoting mirror device for pivoting a reflecting surface, about two mutually perpendicular pivoting axes parallel to the reflecting surface under the influence of electrical control signals, such as a pivoting mirror device for radially and tangentially following the information track of a rotating optically readable video disk with a light spot produced by a light beam, and comprising a frame, a mirror which is pivotable relative to the frame about said pivoting axes and which comprises a base of which one surface is provided with a reflecting layer, a bearing for the mirror, and furthermore electro-dynamic drive means for pivoting the mirror under the influence of the electrical control signals and comprising permanent magnetic means connected to the mirror as well as electro-magnetic means co-operating therewith and connected to the frame, which electromagnetic means comprise one or more control coils which, at least in a direction parallel to the reflecting surface of the mirror, are located farther from the center of this surface than the permanent magnetic means.

From Swiss Patent Specification 354117 a pivoting mirror device is known in which the mirror consists of a permanent magnetic body on which the reflecting layer is provided. Thus,. the base of the mirror at the same time constitutes one of the electro-dynamic drive means, namely the permanent-magnetic part thereof which is connected to the mirror. The base is journalled in that it is embedded in a rubber-like compound which is located between the pole-pieces of a U-shaped yoke on which a control coil is mounted. By energizing the coil the mirror is subjected to a torque, so that it performs a pivoting movement in the elastic material in which it is embedded. It is alternatively possible to dispose the mirror in a rubber-like compound which is located in a space between the pole-pieces of two mutually perpendicular yokes, which are each provided with an associated control coil, so that the reflecting surface can pivot about two mutually perpendicular axes.

The known mirror was intended for use in television receivers of the type in which a light beam instead of an electron beam is controlled. In view of the application pursued, in particular with regard to the dimensions of television tubes at that time, only a slight movability of the mirror was required, so that completely embedding the mirror, while leaving the reflecting surface free was a satisfactory solution for the object pursued. In recent years there has been a substantial revival of the interest in pivoting mirror devices in view of applications in video players. In recent years video players are being developed, which enable video information on a rotating disk to be read with the aid of a light beam, for example a laser beam, which with the aid of optical means, among which a pivoting mirror device, is aimed at the disk for accurately following and reading the tracks on the disk, see for example the articles "The Philips VLP system", Philips Technical Review 33, 178-193, 1973, no. 7; "Ein neues Bildplattensystem mit transparanter Folie", Funkschau, Heft 20, 2286-2288, 1974, and "The MCA Disco-Vision System", Journal of the SMPTE, volume 83, July 1974. For applications in such video players the pivoting mirror device should comply with other requirements than that which is known from the cited Swiss Patent Specification. In particular, a much greater movability of the mirror is required, i.e., using a relatively low power a comparatively large deflection of the pivoting mirror must be obtainable at a comparatively low frequency. The beam deflection device is included in an automatic tracking system, which serves for following the tracks on the video disk with the read beam. The speed of revolution of the video disk is 1500 or 1800 revolutions per minute, depending on the mains frequency which may be 50 or 60 Hz. For following the track, the beam deflection device must be capable of following an oscillation of the track with an amplitude of $200\mu$ with an oscillation frequency of 25 Hz.

It is an object of the invention to provide a pivoting mirror device which is in particular suited for use in video players and the invention is characterized in that the mirror is supported by the bearing near its center so as to be omnilaterally pivotable, said permanent magnetic drive means are magnetized in such a way that the magnetic field lines, at least at the location of the control coils, extend substantially parallel to the reflecting surface, at least a part of the turns of the control coils extend parallel to the reflecting surface and transversely to said field lines, and the permanent magnetic drive means co-operate with permanent magnetic positioning means, which are connected to the frame, for bringing and maintaining the mirror in a neutral position in the absence of control signals, which permanent magnetic positioning means continually exert a force of attraction, which subjects the bearing to pressure, on the permanent magnetic control means, and furthermore are magnetized in such a way that the magnetic field lines locally extend in the direction opposite in the field lines of the permanent magnetic control means.

This combination of steps yields the desired effect. By centrally supporting the mirror near its center, pivoting movements in directions about two perpendicular axes can be made with a comparatively low resistance. The arrangement of the magnetic and electro-dynamic means ensures a good efficiency of the drive means. The permanent magnetic positioning means furthermore ensure that if in the case of a very weak support of the mirror, i.e., a support which offers little resistance to pivoting movements of the mirror, the mirror returns to its neutral position in the absence of control signals. By a suitable choice and arrangement of the permanent magnetic positioning means it is then possible to ensure that the force with which the mirror is permanently loaded in the direction of its support as well as the counteracting forces during pivoting movements of the mirror, have the correct values.

In one embodiment of the invention said support of the mirror consists of a pivot bearing which comprises a pivot pin which is connected to the frame and whose center line is perpendicular to the reflecting surface of the mirror, as well as a socket which co-operates with the pivot pin at its pointed free end (to be called upper end hereinafter), which socket is located at the side which is remote from the reflecting surface (to be called underside hereinafter) of the mirror. It is advantageous to use a pivot pin whose pointed upper end consists of a jewel. Such an application has the unexpected advantage that a so-called pick-up stylus of a pick-up unit for scanning grammophone-records may be used. Before such styli are ground the jewel is usually first foldered onto a steel pin so as to facilitate handling of the pick-up stylus during the necessary operations. The steel pin with soldered-on pick-up stylus may readily be employed as a pivot pin for the pivoting mirror device according to the invention. Suitably, the socket also consists of a jewel, in order to obtain a very robust pivot bearing.

The pivoting mirror device according to the invention is very sensitive and consequently forms a comparatively vulnerable part of a video player. In order to prevent the pivoting mirror device from being damaged under the influence of shocks, for example during transport, an embodiment is of importance which is characterized in that the lower end of the pivot pin is connected to the frame so as to be axially depressable to a limit extend with the aid of resilient means, which load the pivot pin towards its upper end. Owing to the pivot bearing being resiliently supported the resistance to shocks is substantially improved, Moreover, in view of the possibility of shocks, stop means which co-operate with the mirror are preferably used, which means check the movements of the mirror in such a way that it cannot spring off the pivot pin.

Figure 2:
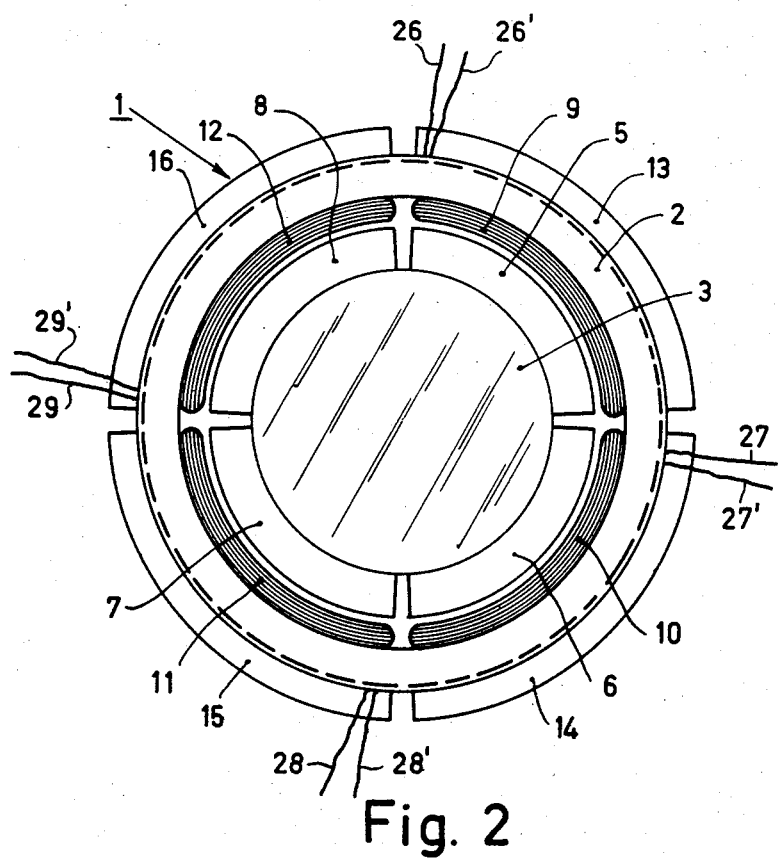
Figure 3:
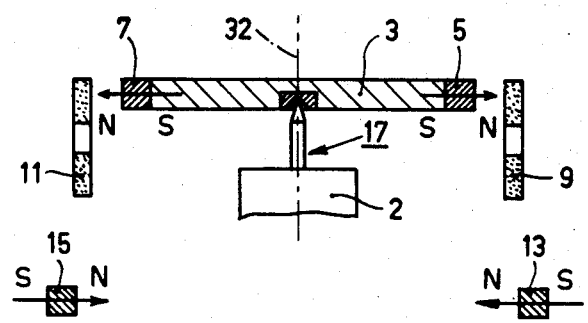

The invention will now be described in more detail with reference to the drawing, in which:

FIG. 1 is a perspective view of the pivoting mirror device according to the invention with a round mirror a sector of the pivoting mirror device being cut away so as to clarify the construction, FIG. 2 is a plan view of the pivoting mirror device of FIG. 1, the threaded cover at the top being removed for clarity, and FIG. 3 is a highly schematic cross-section so as to illustrate the arrangement and the mutual co-operation of the permanent magnets and the control coils.

In FIG. 1 the pivoting mirror device is designated by the general reference numeral 1. It comprises a frame which has the reference numeral 2 and which consists of an aluminium alloy. The round mirror is designated by the reference numeral 3 and comprises a ceramic base on which a very thin reflecting layer is coated, which is extremely thin and is not denoted by a separate reference numeral in the Figure. The bearing of the mirror has the general reference numeral 4 and its components will be described in more detail hereinafter. The electro-dynamic drive means for causing the mirror 3 to pivot under the influence of electrical control signals comprise four permanent magnetic means 5, 6, 7 and 8, which are connected to the mirror, see in particular FIG. 2. They are glued to the circumference of the mirror 3. The permanent magnets 5 through 8 co-operate with four electro-magnetic means consisting of the four control coils 9 through 12, which are connected to the frame 2. The substantially oval coils are glued to the cylindrical inner surface of the vertical part of the frame 2, in a position which corresponds to the position of the four permanent magnets 5 through 8. These coils are farther away from the center of the reflecting surface than the permanent magnets 5 through 8, at least in the direction parallel to the reflecting surface of the mirror 3.

The magnets 5 through 8 have been magnetized so that the magnetic field lines at least at the location of the control coils 9 through 12 extend substantially parallel to the surface of the mirror 3. Moreover, at least a part of the turns of the coils 9 through 12 extend parallel to the reflecting surface and transversely to said field lines; in FIG. 1 these are the parts of the turns which are disposed at the top and the bottom of the coils. It is obvious that especially the turns at the top of the coils play a part, as they always extend transversely to the field lines of the permanent magnets, thus ensuring a favorable efficiency of the drive means of the mirror.

At the bottom of the housing 2, i.e., the side of the housing opposite the side where the mirror 3 is located, four permanent magnetic positioning means 13, 14, 15 and 16 are disposed. These means serve for bringing and maintaining the mirror 3 in a neutral position in the absence of control signals and moreover for constantly loading the mirror 3 towards the bearing 4. These magnets have been magnetized so that the magnetic field lines at least locally extend in an opposite direction with respect to the field lines of the permanent magnetic control means 5 through 8.

The bearing 4 of the mirror consists of a pivot bearing which comprises a pivot pin 17 which is connected to the frame 2 and whose center line is perpendicular to the reflecting surface of the mirror, as well as a socket 18, which co-operates with the pivot pin at its pointed upper end 19, and which is located at the underside of the mirror 3 and is glued thereto. The pointed free end 19 of the pivot pin 17 consists of a jewel, for example sapphire or diamond, and is essentially a pick-up stylus which is soldered onto a metal shaft 20. The socket 18 also consists of a jewel, for example a ruby. The shaft 20 is disposed in a plastic sleeve 21 which is glued in the frame. At its end which faces downwards the shaft 20 has a flange-shaped portion 22 which is movable in the plastic sleeve 21, i.e., in a part with a bore of slightly greater diameter than that in which the rest of the shaft 20 is located. The lower end of the pivot pin 17 is axially loaded in an upward direction with the aid of a pressure spring 23, in such a way that the pivot pin as a whole is axially depressable to a limited extent relative to the frame. The spring 23 is retained with the aid of a screw 24.

At its top the frame 2 is closed with the aid of a threaded cover 25 whose edge 26 constitutes a stop which limits the movements of the mirror in such a way that the mirror cannot spring off the pivot pin 17 in an upward direction.

The control coils 9 through 12 are all provided with coil leads which are numbered 26 and 26' for coil 9, 27 and 27' for coil 10, etc. up to 29 and 29' for coil 12. With the aid of these coil leads the pivoting mirror device is connected to electronic control means which belong to a control circuit for following the tracks of a video disk in a radial and tangential direction. These leads are lead out through openings in the housing 2, two of these openings, numbered 30 and 31 being visible in FIG. 1.

One of the advantages of the invention is that by an appropriate choice of the position of the positioning magnets 13 through 16 relative to the central optical axis 32 of the pivoting mirror device, both the force with which the mirror 3 is drawn to the pivot 19 and the return force to which the mirror is subjected when it is moved out of its neutral position, can be varied, i.e., to a limited extent and independently of each other. FIG. 3 is particularly suitable for illustrating this. In this Figure the directions of magnetization of the permanent magnets 5 and 7 as well as the associated positioning magnets 13 and 15 are indicated by an arrow and the letters N and S, N referring to northpole and S to southpole. By moving the positioning magnets 13 and 15 towards or away from the axis 32, the return force which these magnets exert on the mirror can be varied to a certain extent and in a limited range, independently of the force with which the mirror is pulled onto the tip of the pivot pin 17. Thus, it is possible to construct a pivoting mirror device which meets the requirements, in particular as regards the load of the pivot 19 and the natural frequency with which the mirror vibrates out of its neutral position in the case of a limited deflection. This last-mentioned aspect is an important data for the dynamic behavior of the control device of which the pivoting mirror device forms part and also for the power consumption.

What is claimed is:

1. A pivoting mirror device for directing a light beam in a video disk player comprising a frame, an elongated pivotal bearing extending from the frame, a mirror centrally supported on said bearing for pivotal motion, said mirror having a reflective surface on a side opposite said bearing, at least one permanent magnet near the edge of said mirror and being radially polarized with respect to said pivot, said permanent magnet on said mirror providing local magnetic field lines extending substantially parallel to the reflecting surface of said mirror, and an electro-dynamic drive means in the path of said magnetic field lines for pivoting said mirror about said bearing under the influence of an electric control signal and comprising at least one control coil of wire, substantially all of the wire in said control coil extending substantially parallel to the mirror surface.

2. A pivoting mirror device as claimed in claim 1 wherein said bearing of the mirror consists of a pivot bearing, which comprises a pointed pivot pin which is connected to the frame and whose center line is perpendicular to the reflecting surface of the mirror, and a socket which co-operates with the pivot pin at its pointed end, which socket is located at the side of the mirror which is remote from the reflecting surface.

3. A pivoting mirror device as claimed in claim 2, wherein the pointed end of the pivot pin consists of a jewel.

4. A pivoting mirror device as claimed in claim 2, wherein the bearing socket consists of a jewel.

5. A pivoting mirror device as claimed in claim 2, wherein a lower end of the pivot pin is connected to the frame so as to be axially depressable to a limited extent, and a resilient means, for loading the pivot pin towards its upper end.

6. A pivoting mirror device as claimed in claim 1, further comprising stop means near the mirror for checking the movements of mirror is such a way that the mirror cannot spring off the pivot pin.

* * * * *

UNITED STATES PATENT AND TRADEMARK OFFICE
CERTIFICATE OF CORRECTION

PATENT NO. : 4,073,567
DATED : February 14, 1978
INVENTOR(S) : HERMAN GERARD LAKERVELD et al.

It is certified that error appears in the above—identified patent and that said Letters Patent are hereby corrected as shown below:

Column 2, line 64, "foldered" should be --soldered--

Column 3, line 12, "extend" should be --extent--

Signed and Sealed this

Twentieth Day of June 1978

[SEAL]

Attest:

RUTH C. MASON
Attesting Officer

DONALD W. BANNER
Commissioner of Patents and Trademarks